United States Patent
Okada et al.

(10) Patent No.: US 7,050,118 B2
(45) Date of Patent: May 23, 2006

(54) DIGITAL BROADCAST RECEIVING APPARATUS

(75) Inventors: Shigeyuki Okada, Ogaki (JP); Kouichi Yamada, Gifu (JP); Mamoru Mukuno, Hashima (JP)

(73) Assignee: Sanyo Electric Co., Ltd., Osaka (JP)

( * ) Notice: Subject to any disclaimer, the term of this patent is extended or adjusted under 35 U.S.C. 154(b) by 580 days.

(21) Appl. No.: 09/964,578

(22) Filed: Sep. 28, 2001

(65) Prior Publication Data

US 2002/0040481 A1 Apr. 4, 2002

(30) Foreign Application Priority Data

Oct. 3, 2000 (JP) .............................. 2000-303508

(51) Int. Cl.
*H04N 5/50* (2006.01)
(52) U.S. Cl. ...................... 348/731; 348/725; 348/732; 348/554
(58) Field of Classification Search ................ 348/725, 348/731, 732, 733, 734, 554; 455/174.1, 455/188.1, 191.1, 192.3, 194.1; H04N 5/50
See application file for complete search history.

(56) References Cited

U.S. PATENT DOCUMENTS

| 6,118,498 | A  | * | 9/2000  | Reitmeier ..................... 348/725 |
| 6,334,217 | B1 | * | 12/2001 | Kim ............................. 725/38 |
| 6,600,522 | B1 | * | 7/2003  | Kim ............................ 348/732 |
| 6,710,816 | B1 | * | 3/2004  | Minami ....................... 348/554 |
| 6,714,264 | B1 | * | 3/2004  | Kempisty ..................... 348/732 |
| 6,731,349 | B1 | * | 5/2004  | Van Der Wijst ............. 348/732 |

FOREIGN PATENT DOCUMENTS

| JP | 2001-517904 | 10/2001 |
| JP | 2001-309255 | 11/2001 |
| WO | WO 99/16247 | 4/1999 |

OTHER PUBLICATIONS

Office Action dated Apr. 28, 2004.

* cited by examiner

*Primary Examiner*—John Miller
*Assistant Examiner*—Trang U. Tran
(74) *Attorney, Agent, or Firm*—Westerman, Hattori Daniels & Adrian, LLP

(57) ABSTRACT

The digital broadcast receiving apparatus according to the present invention includes a tuning unit for outputting normal image data for performing a normal reproduction operation corresponding to a user selected channel, a memory unit for outputting background image data for performing a background reproduction operation when the normal reproduction operation cannot be performed, a data selector for receiving the normal image data and the background image data and outputting one of the normal image data and the background image data, and an MPEG video decode unit for decoding image data output by the data selector to generate an image signal. The tuning unit successively receives the respective channel selected in the background independently of the user selection, and stores the background image data corresponding to the respective channels in the memory unit.

9 Claims, 10 Drawing Sheets

DIGITAL BROADCAST RECEIVING APPARATUS

BACKGROUND OF THE INVENTION

1. Field of the Invention

The present invention relates to a digital broadcast receiving apparatus, and more specifically, to a digital broadcast receiving apparatus for receiving a digital television broadcast.

2. Description of the Background Art

In recent years, the digitization project of television broadcast is rapidly progressing worldwide. Particularly, in the field of digital television broadcast, the use of MPEG2 (Moving Picture Experts Group 2), which is an international standard of data compression/decompression, enables transmission of a plurality of channels with a single repeater so that the number of channels can be significantly increased. As a result, convenience for the user is expected to improve significantly.

In receiving digital television broadcast, there is a need to decode compressed coded data to obtain the actual image signal and audio signal.

FIG. 11 is a schematic block diagram representing an arrangement of a general digital television broadcast receiving system.

Referring to FIG. 11, a digital television broadcast receiving system 1 includes an antenna 2 for receiving RF signals which are airwaves, and a detection-demodulation unit 3 for performing detection and demodulation of the RF signals according to a channel selection instruction from the user. Detection-demodulation unit 3 outputs transport stream data (hereinafter, also simply referred to as TS data) according to the MPEG2 standard. The TS data is formed as one data stream into which coded data respectively corresponding to an image signal, an audio signal, and a data signal are multiplexed.

Digital television broadcast receiving system 1 further includes a TS separating unit 4 for separating the multiplexed TS data, an audio decode unit 5 for decoding audio coded data received from TS separating unit 4, and a video decode unit 6 for decoding image coded data received from TS separating unit 4.

Audio decode unit 5 and video decode unit 6 executes decoding of the compressed coded data according to the MPEG2 standard. An audio signal and an image signal respectively are output from audio decode unit 5 and video decode unit 6 and transmitted to an audio output unit 7 and an image display unit 8. As a result, from the RF signals received by antenna 2, the image signal and the audio signal corresponding to the user channel selection can be output to image display unit 8 and audio output unit 7.

In addition, although not shown in FIG. 11, data signal that is included in the TS data can also be output to image display unit 8 by executing decoding based on the MPEG2 standard.

In the digital television broadcast, however, it is inherently difficult immediately to display a real time image corresponding to the airwaves upon power-on of the receiving apparatus or upon switching of the channel selection by the user (hereinafter, also described simply as "upon channel switching"). During this period, no image is displayed on image display unit 8 so that there is a possibility that unnecessary anxiety and stress may be caused to the user.

Returning to FIG. 11, in order to start data demodulation in detection-demodulation unit 3, it is required that received data of at least a prescribed amount that is the minimum required for execution of error correction be accumulated. Consequently, upon power-on or upon channel switching, outputting of TS data from detection-demodulation unit 3 is delayed for the period during which the prescribed amount of received data is accumulated. In addition, in decoding the image coded data, there is a possibility of delay being generated in image display due to the nature of the MPEG2 standard.

FIG. 12 is a schematic diagram related to the description of a composition of image coded data according to MPEG2.

Referring to FIG. 12, the image coded data according to MPEG2 (hereinafter, also simply referred to as MPEG2 image coded data) is expressed as bit stream data having a hierarchical arrangement. Particularly, in the MPEG2 standard, data corresponding to several pictures are treated as a prescribed segment called GOP (Group of Pictures), and the GOP structure is adopted which allows random access by the unit of GOP.

In other words, MPEG2 image coded data is formed by a plurality of GOPs, and a sequence header SH is provided corresponding to each GOP. Information such as data size is recorded in the sequence header SH, and the sequence header SH is used, for instance, to locate the start of random access performed by the unit of GOP.

One GOP includes picture data generated by compression-coding a prescribed number of original pictures. In the MPEG2 standard, the picture data can be categorized into the following three picture types based on the compression coding scheme of the original pictures: an I picture (Intra-coded picture), a P picture (Predictive-coded picture), and a B picture (Bidirectionally predictive-coded picture).

The I picture, also referred to as an intra-coded picture, involves coding of one original picture alone whose information is independent of other original pictures. Thus, the I picture is independent of other pictures that precede or succeed it and can be decoded by itself. Each GOP is formed such that it includes at least one I picture.

The P picture, also referred to as an inter-frame predictive-coded picture, utilizes an I picture or a P picture of an earlier time already decoded as a predicted image (image that serves as a reference in order to take the difference) and involves coding of the motion-compensated difference between the original P picture and the predicted image.

The B picture, also referred to as a bidirectionally predictive-coded picture, is coded as an image to be inserted between the I picture and the P picture after the I picture and the P picture are processed in advance. In other words, the B picture utilizes the following three kinds of pictures as a predicted image: 1) the I picture or the P picture of an earlier time already decoded, 2) the I picture or the P picture of a later time already decoded, and 3) an interpolated image made from 1) and 2).

Thus, video decode unit 6 cannot output an image signal until a sequence header and an I picture is properly decoded. Moreover, in order to adjust the output timing of audio decode unit 5 and video decode unit 6 so as to ensure the synchronization between the image signal output to image display unit 8 and the audio signal output to audio output unit 7, i.e. the AV synchronization, a certain amount of coded data must be accumulated in audio decode unit 5 and video decode unit 6. As a consequence, image display would also be delayed for the period during which coded data required to ensure the AV synchronization is accumulated. The delay of the image display upon power-on or upon channel switching due to these factors may be expected to amount to about two to three seconds.

On the other hand, as a user is selecting a channel, when a specific channel that the user wishes to view cannot be found, the user tends to manipulate the channel selection by selecting the channels instantly and continuously in order to grasp in a short time the contents of broadcast on the respective channels. Hereinafter, such channel selecting manipulation would also be referred to as a "channel sampling manipulation."

It is likely that the "channel sampling manipulation" that the user routinely performs with the analog television broadcast cannot be performed smoothly with the digital television broadcast due to the influence of delay in the image display upon channel switching described above. Particularly, after the user inputs a channel switching instruction, a period created during which no image signal is output by image display unit 8 is very likely to cause the user discomfort due to unnecessary anxiety and stress.

SUMMARY OF THE INVENTION

An object of the present invention is to provide a digital broadcast receiving apparatus that provides an appropriate image display upon power-on or upon channel switching until the display of the normal real time images corresponding to the selected channel becomes possible so as to prevent causing discomfort to the user.

According to the present invention, a digital broadcast receiving apparatus for selectively receiving a desired channel based on a user instruction from a plurality of channels included in airwaves includes a first tuning unit for extracting from the airwaves first image coded data that corresponds to the desired channel, a second tuning unit for successively selecting one of the plurality of channels as a background channel and extracting from the airwaves second image coded data that corresponds to the background channel, a data storage unit for storing the second image coded data that correspond to the respective ones of the plurality of channels, a control unit for determining whether it is possible or impossible to generate an image signal based on the first image coded data, and a first image data decoding unit for decoding the second image coded data from the data storage unit to generate an image signal for image display when image display based on the first image coded data is impossible in accordance with the determination of the control unit.

Preferably, the digital broadcast receiving apparatus further includes a first data selecting unit for receiving the first image coded data from the first tuning unit and the second image coded data from the data storage unit corresponding to the desired channel and selectively outputting one of the first image coded data and the second image coded data according to the determination of the control unit. The first image data decoding unit decodes an output from the first data selecting unit to generate an image signal.

Preferably, the digital broadcast receiving apparatus further includes a second image data decoding unit for decoding the second image coded data extracted by the second tuning unit, and an image data coding unit for recoding the second image coded data decoded by the second image data decoding unit. The data storage unit stores the second image coded data recoded by the image data coding unit, and the recoded second image coded data has a smaller amount of data than the second image coded data extracted by the second tuning unit.

Preferably, the digital broadcast receiving apparatus further includes a data buffer unit for temporarily accumulating the image signal output from the first image data decoding unit, an image data coding unit for recoding the image signal, a first data selecting unit for selectively outputting the image signal output by the first image data decoding unit to one of the data buffer unit and the image data coding unit according to the determination of the control unit, and a second data selecting unit for receiving the first image coded data from the first tuning unit and the second image coded data from the data storage unit corresponding to the desired channel, and the second image coded data from the second tuning unit corresponding to the background channel, and for outputting to the first image data decoding unit one of the first image coded data, the second image coded data from the data storage unit, and the second image coded data from the second tuning unit according to the determination of the control unit. The data storage unit stores the image signal recoded by the image data coding unit as the second image coded data, and the recoded second image coded data has a smaller amount of data than the second image coded data extracted by the second tuning unit.

According to the digital broadcast receiving apparatus of the present invention, immediately after channel switching and the like, the image coded data corresponding to a video image of the past of the desired channel stored within in advance as a background channel can be read so as to display the video image until the display of a real time video image corresponding to a desired channel becomes possible. As a result, even when the user switches the channel selection successively, the video image display would not be interrupted so that the user would not experience any discomfort.

Moreover, the contents of the image coded data stored inside in advance for the respective channels are successively updated in a constant cycle so that the user can grasp the contents of broadcast on the respective channels in a short time by successive switching of the channel selection.

In addition, the data storage unit stores as image coded data corresponding to the background channel the image signal recoded to a smaller amount of data so that the data storage unit can be reduced in size.

According to another aspect of the present invention, a digital broadcast receiving apparatus for selectively receiving a desired channel based on a user instruction from a plurality of channels included in airwaves includes a tuning unit for extracting from the airwaves first image coded data that corresponds to the desired channel, a data storage unit for storing second image coded data for displaying a prescribed picture, a control unit for determining whether it is possible or impossible to generate an image signal based on the first image coded data, and an image data decoding unit for decoding the second image coded data from the data storage unit to generate an image signal for image display when the image display based on the first image coded data is impossible in accordance with the determination of the control unit.

Preferably, the digital broadcast receiving apparatus further includes a data selecting unit for receiving the first image coded data from the tuning unit and the second image coded data from the data storage unit corresponding to the desired channel and selectively outputting one of the first image coded data and the second image coded data according to the determination of the control unit. The image data decoding unit decodes an output from the data selecting unit to generate an image signal.

Moreover, according to the digital broadcast receiving apparatus of the present invention, the image coded data corresponding to a prescribed picture stored within in advance can be read so as to display the video image until the display of a real time video image corresponding to a desired channel becomes possible. As a result, even when there is only one tuning unit that has a tuner function, the video image display would not be interrupted immediately after power-on or immediately after channel switching, so that the user would not experience any discomfort.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention will be described in detail below with reference to the drawings.

First Embodiment

Figure 1:
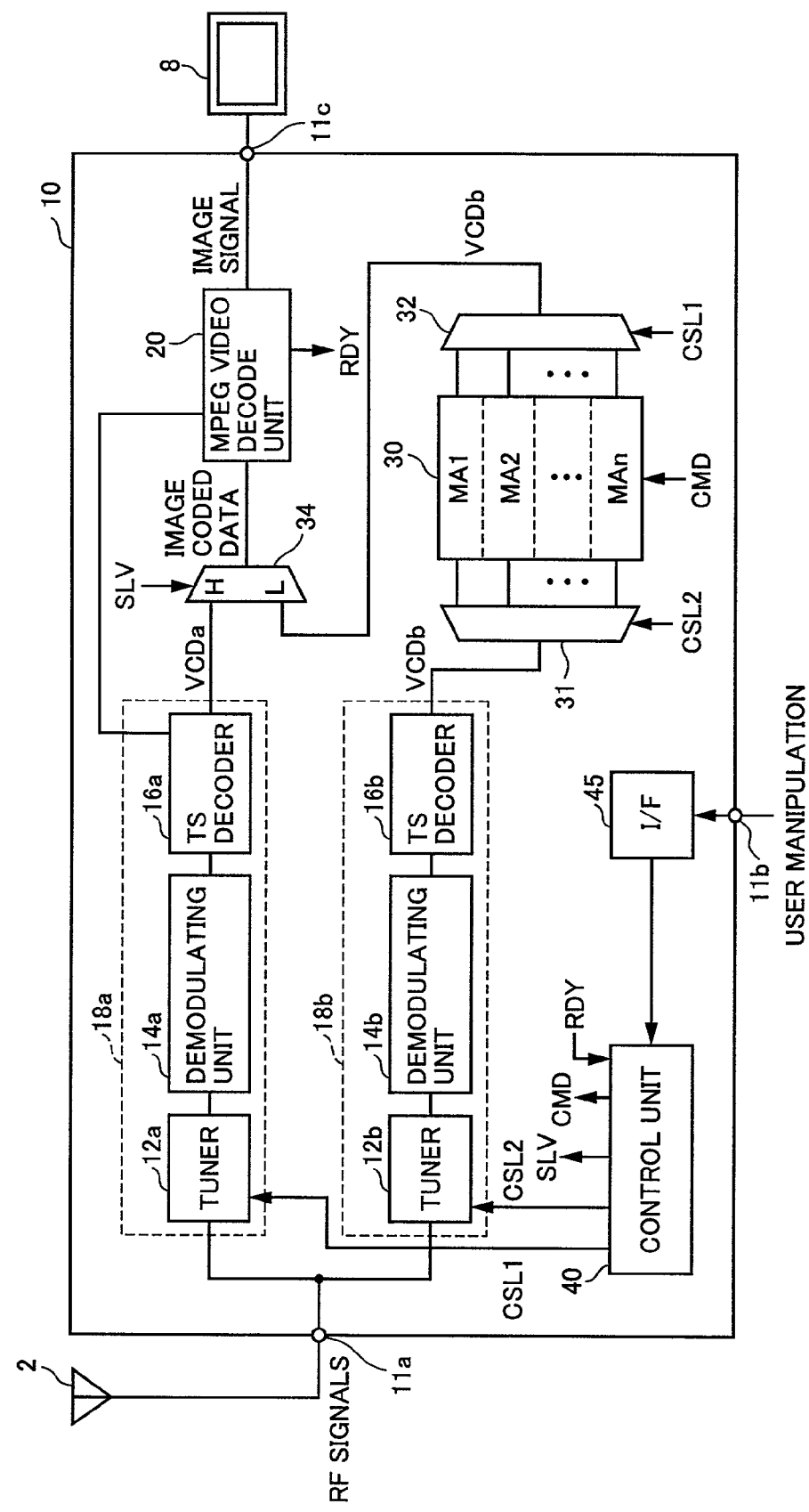
FIG. 1 is a block diagram related to the description of a main portion related to image signal processing of digital broadcast receiving apparatus according to a first embodiment of the present invention.

Referring to FIG. 1, a digital broadcast receiving apparatus 10 according to the first embodiment of the present invention includes an input terminal 11a for receiving RF signals which are the airwaves received by an antenna 2, an input terminal 11b for receiving user manipulation such as power-on and channel selection, and an output terminal 11c for outputting to an image display unit 8 an image signal corresponding to a desired channel selected by the user. The user manipulation that is input to input terminal 11b may be input from a user control unit integrally provided with digital broadcast receiving apparatus 10 by a panel or the like, or may be input using a remote control from outside digital broadcast receiving apparatus 10 by infrared rays or the like.

Digital broadcast receiving apparatus 10 further includes tuning units 18a and 18b for extracting the image coded data corresponding to a prescribed channel from the RF signals. Tuning unit 18a includes a tuner 12a for tuning according to a channel selecting signal CSL1, a demodulating unit 14a for demodulating a signal selected by tuner 12a, and a transport stream decoder (hereinafter, referred to as a TS decoder) 16a for converting a demodulated signal into TS data.

Similarly, tuning unit 18b includes a tuner 12b for performing tuning according to a channel selecting signal CSL2, a demodulating unit 14b for demodulating a signal selected by tuner 12b, and a TS decoder 16b for converting a demodulated signal into TS data. Consequently, TS decoders 16a and 16b extract a baseband signal corresponding to a selected channel.

Provision of two systems of tuning units 18a and 18b allows the receiving operation to be performed for background reproduction as will be described later, even while an image corresponding to the user desired channel is being displayed on image display unit 8. Tuning unit 18a performs, according to channel selecting signal CSL1, the tuning corresponding to the desired channel selected by the user. On the other hand, tuning unit 18b performs in the background, according to channel selecting signal CSL2, the tuning corresponding to channels that are successively selected independently of the user desired channel.

In the arrangement of FIG. 1, of the TS data which are coded data according to the MPEG2 standard output from TS decoders 16a and 16b, only the arrangement related to image coded data is illustrated. TS decoder 16a outputs image coded data VCDa corresponding to the desired channel, and TS decoder 16b outputs image coded data VCDb received in the background.

When performing the reproduction based on an image signal obtained by decoding image coded data VCDa from tuning unit 18a, the user desired channel can be extracted from the airwaves and a real time image can be displayed. Hereinbelow, the image display based on image coded data VCDa is also referred to as normal reproduction. On the other hand, the image display based on image coded data VCDb from tuning unit 18b is also referred to as background reproduction.

When digital broadcast receiving apparatus 10 is to be provided with a multi-channel display feature for providing multiple display of a plurality of channels on image display unit 8, a multiple systems of tuning units inevitably becomes necessary. Thus, in digital broadcast receiving apparatus 10 having the multi-channel display feature, one of a plurality of systems of tuning units arranged may be used for the background receiving operation when the multi-channel display feature is not selected.

Digital broadcast receiving apparatus 10 further includes an MPEG video decode unit 20, a control unit 40 for controlling an image processing operation in digital broadcast receiving apparatus 10, and an interface unit 45 for transmitting to control unit 40 the user manipulation input to input terminal 1b.

Digital broadcast receiving apparatus 10 further includes a memory unit 30 for recording image coded data received in the background. Memory unit 30 has a plurality of memory regions MA1 to MAn respectively corresponding to n channels (n is a natural number) that are receivable. Memory unit 30 performs writing, storing, and reading of data in response to a memory control signal CMD which is generated by control unit 40.

Digital broadcast receiving apparatus 10 further includes a data selector 31 for selectively transmitting image coded data VCDb output from TS decoder 16b to one of memory regions MA1 to MAn, a data selector 32 for outputting one of image coded data output respectively from memory regions MA1 to MAn, and a data selector 34. Data selector 34 outputs to MPEG video decode unit 20 one of image coded data VCDa output from TS decoder 16a and image coded data VCDb output from data selector 32.

MPEG video decode unit 20 includes a decode LSI for decoding image coded data transmitted from data selector 34, a work memory used as a buffer to store data temporarily, and so on, which are not shown.

Control unit 40 generates a channel selecting signal CSL1 based on user channel selection, a channel selecting signal CSL2 periodically for switching a background channel independent of the user channel selection, a reproduction data selecting signal SLV for selecting a data output in data selector 34, and memory control signal CMD for controlling the operation of memory unit 30.

Channel selecting signal CSL1 is set corresponding to a desired channel selected by the user. Channel selecting signal CSL2 is set to allow periodical and successive selection of one of n channels that can be received as a background channel independently of the user channel selection.

Data selector 31 transmits image coded data VCDb output from tuning unit 18b to a memory region corresponding to the background channel in memory unit 30 according to channel selecting signal CSL2. Control unit 40 instructs the data write to memory unit 30 at a timing that coincides with the timing at which image coded data VCDb is transmitted from data selector 31.

In this manner, in memory unit 30, image coded data corresponding to the past pictures received in the background are stored as background data respectively corresponding to the n channels that are receivable. The background data corresponding to the respective channels are periodically updated according to channel selecting signal CSL2.

As background data, image coded data of an I picture, for instance, may be stored as static image data. In addition, the I picture and a B picture and a P picture related to the I picture may be combined and stored as motion image data of a very brief duration.

When the channel selection is switched through user manipulation, control unit 40 changes the setting of channel selecting signal CSL1. In response to this change, tuning unit 18a starts generating image coded data VCDa corresponding to a newly selected channel Hereinafter, also referred to as a post-switching channel). Before the normal reproduction corresponding to the post-switching channel becomes possible, however, a certain time period is required until the generated image coded data VCDa reaches a certain amount.

MPEG video decode unit 20 monitors the generation status of image coded data VCDa corresponding to the post-switching channel in TS decoder 16a, and generates a flag signal RDY indicating whether the normal reproduction corresponding to the post-switching channel is possible. Flag signal RDY is reset to the logic low or the L level in response to switching of the channel selection. Until image coded data VCDa generated by TS decoder 16a reaches a certain amount that allows the normal reproduction, flag signal RDY is maintained at the L level.

Control unit 40 instructs the execution of background reproduction during the period in which flag signal RDY is at the L level (hereinafter, also referred to as a normal reproduction wait period).

Control unit 40 instructs memory unit 30 to perform reading of background data stored in memory regions MA1 to MAn in response to switching of the channel selection. Data selector 32 selects background data output from memory unit 30 according to channel selecting signal CSL1, and outputs to data selector 34 image coded data VCDb that corresponds to the post-switching channel.

Control unit 40 generates reproduction data selecting signal SLV in response to a signal level of flag signal RDY that indicates whether normal reproduction is possible. In other words, during the normal reproduction wait period in which normal reproduction is not ready to be performed, reproduction data selecting signal SLV instructs data selector 34 to output image coded data VCDb to perform background reproduction. Consequently, even when the image display by normal reproduction cannot be provided immediately after channel switching, the display of a past image corresponding to the post-switching channel can be provided so that discomfort can be removed for the user.

Since tuning by tuning unit 18a and demodulation operation are performed in parallel with the background reproduction, normal reproduction would become possible after at least a certain amount of image coded data VCDa corresponding to the post-switching channel have been generated. MPEG video decode unit 20 changes the signal level of flag signal RDY from the L level to the logic high or the H level when the normal reproduction becomes possible.

Accordingly, control unit 40 switches the signal level of reproduction data selecting signal SLV. In response, data selector 34 switches the image coded data to be transmitted to MPEG video decode unit 20 from image coded data VCDb for background reproduction to image coded data VCDa for normal reproduction. Thereafter, the signal levels of flag signal RDY and reproduction data selecting signal SLV are maintained until a new channel switching manipulation is input. In this manner, when data selector 34 is provided and the image coded data to be supplied to MPEG video decode unit 20 are switched, MPEG video decode unit 20 can be shared by normal reproduction and background reproduction.

Figure 2:
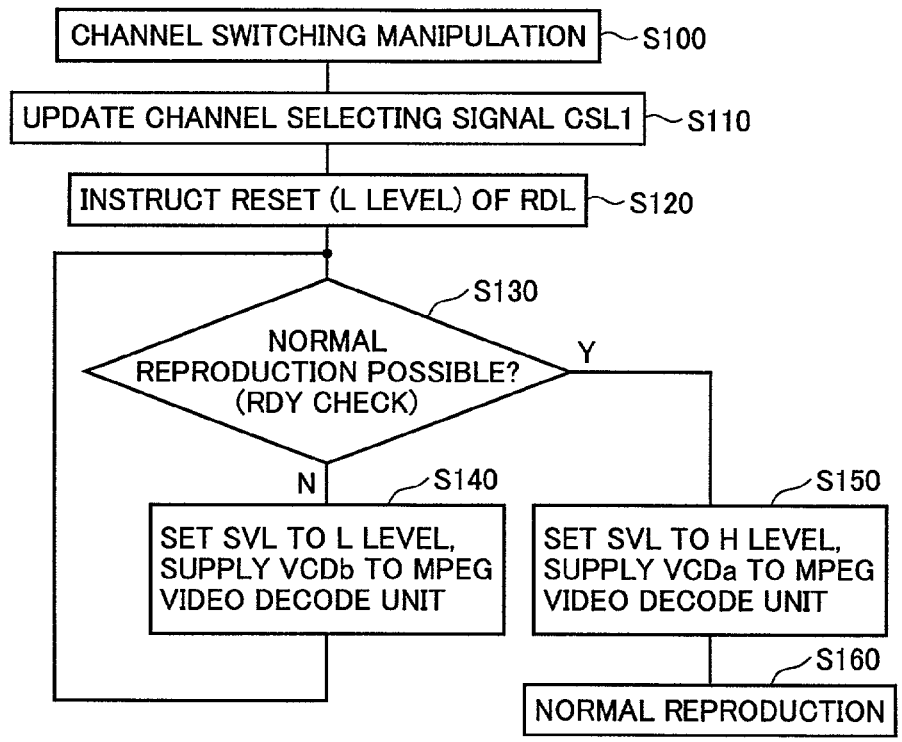
FIG. 2 is a flow chart related to the description of a control operation of a control unit 40 upon switching of channel selection by a user.

Referring to FIG. 2, when user performs the manipulation to switch the channel selection (step S100), control unit 40 updates channel selecting signal CSL1 according to the user channel selection (step S110). Moreover, control unit 40 instructs MPEG video decode unit 20 to reset (to the L level) flag signal RDY (step S120).

Control unit 40 monitors the signal level of flag signal RDY to check whether normal reproduction corresponding to the post-switching channel is possible (step S130). When normal reproduction is not ready to be performed, reproduction data selecting signal SLV is set to the L level, and image coded data VCDb which is the background data output from data selector 32 is sent to MPEG video decode unit 20 (step S140). As a result, background reproduction is performed during the normal reproduction wait period. Step 140 is performed repeatedly until the normal reproduction becomes possible.

When the normal reproduction is ready to be performed and the signal level of flag signal RDY changes to the H level, control unit 40 changes the signal level of reproduction data selecting signal SLV from the L level to the H level (step S150). Accordingly, image coded data VCDa from TS decoder 16a is transmitted to MPEG video decode unit 20.

Consequently, the normal reproduction corresponding to the post-switching channel is performed (step S160).

Such operation of control unit 40 can be processed using software based on a program recorded in a ROM (Read Only Memory) and the like, for instance. In addition, hardware corresponding to the flow chart shown in FIG. 2 may be provided.

Now, an example of an operation of digital broadcast receiving apparatus 10 will be described using FIG. 3.

Figure 3:
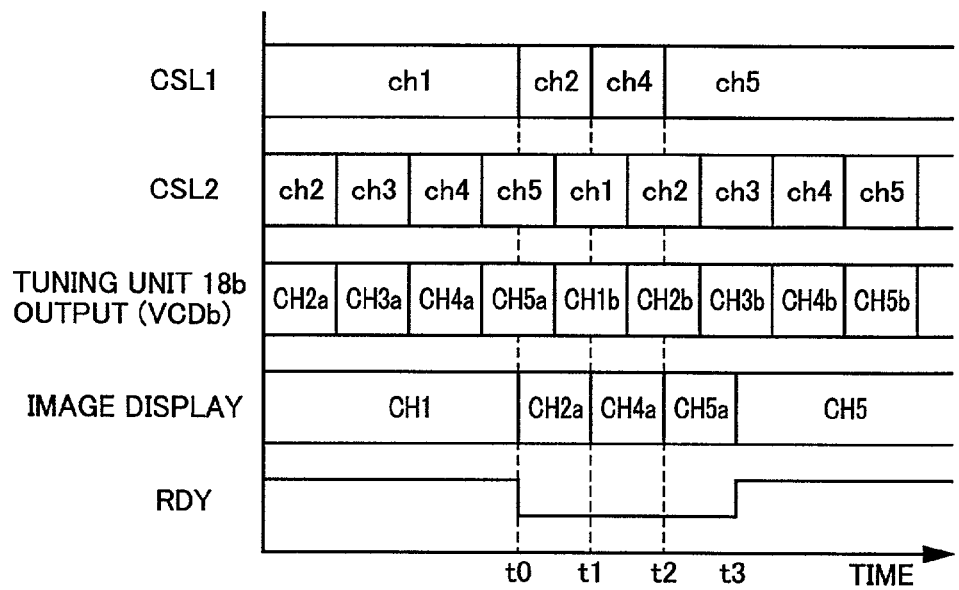
FIG. 3 is a timing chart related to the description of an example of an operation of digital broadcast receiving apparatus according to the first embodiment.

Referring to FIG. 3, a channel ch1 is selected before time t0, and at time t0, the channel selection is switched from channel ch1 to a channel ch2. Moreover, it is assumed that, at time t1, the channel selection is switched from channel ch2 to a channel ch4, and at time t2, from channel ch4 to a channel 5.

Channel selecting signal CSL1 is set according to the user channel selection. In other words, channel selecting signal CSLL selects channels ch1, ch2, ch4, and ch5 before time t0, from time t0 to time t1, from time t1 to time t2, and after time t2, respectively.

Channel selecting signal CSL2 periodically switches the channel selection independently of the user channel selection. FIG. 2 shows the case where the number of receivable channels is five, and five channels ch1 to ch5 are selected periodically by channel selecting signal CSL2.

Image coded data VCDb output from tuning unit 18b according to channel selecting signal CSL2 is stored in memory unit 30 as background data. The background data of the respective channels are updated in a constant cycle. For instance, the background data corresponding to channel ch2 is updated from CH2a to CH2b at time t2. In this manner, background data corresponding to the respective channels are periodically and successively updated in memory regions MA1 to MAn within memory unit 30.

Although not shown, reproduction data selecting signal SLV is reset from the H level to the L level at time t0 when the channel switching is performed. From time t0 to time t1 and from time t1 to time t2, new channel switching manipulation is executed before normal reproduction is made ready so that the signal level of reproduction data selecting signal SLV is maintained at the L level.

Accordingly, prior to time t0, image display unit 8 displays images corresponding to CH1 which is the normal reproduction data of channel ch1. Then, from time t0 to time t1, an image based on background data CH2a corresponding to channel ch2 is displayed on image display unit 8. Similarly, from time t1 to time t2, an image based on background data CH4a corresponding to channel ch4 is displayed on image display unit 8.

After time t2, no new channel switching manipulation is input so that, at a time t3 when normal reproduction becomes ready, the signal level of reproduction data selecting signal SLV changes from the L level to the H level corresponding to the change of flag signal RDY. Thus, from time t2 to time t3, image display unit 8 displays an image based on background data CH5a of channel ch5, and after time t3, displays images based on normal reproduction data CH5 corresponding to channel ch5.

In this manner, even when the user performs channel switching with short intervals, it becomes possible to display successive images correspondingly. Particularly, the period from time t0 to time t3 in which the display based on background data is performed is a period in which the image display based on the received airwaves is impossible in a normal digital broadcast receiving apparatus so that, by successively providing image display during this period, the discomfort caused to the user can be eliminated. In addition, the background data is successively and periodically updated so that the content of the background data can be approximated to the content of a picture according to normal reproduction. Consequently, the so-called channel sampling manipulation that the user performs in order to grasp the contents of broadcast on the respective channels in a short time can be dealt with.

In addition, while the selection of the background channels is performed uniformly with all the receivable channels in the first embodiment, it is also possible to specify the target of selection of background channels to a part of all the receivable channels. In this case, for instance, part of the channels to be the target of selection of background channels can be designated based on the selection frequency of the respective channels and the selecting patterns of the user in the past.

Second Embodiment

Figure 4:
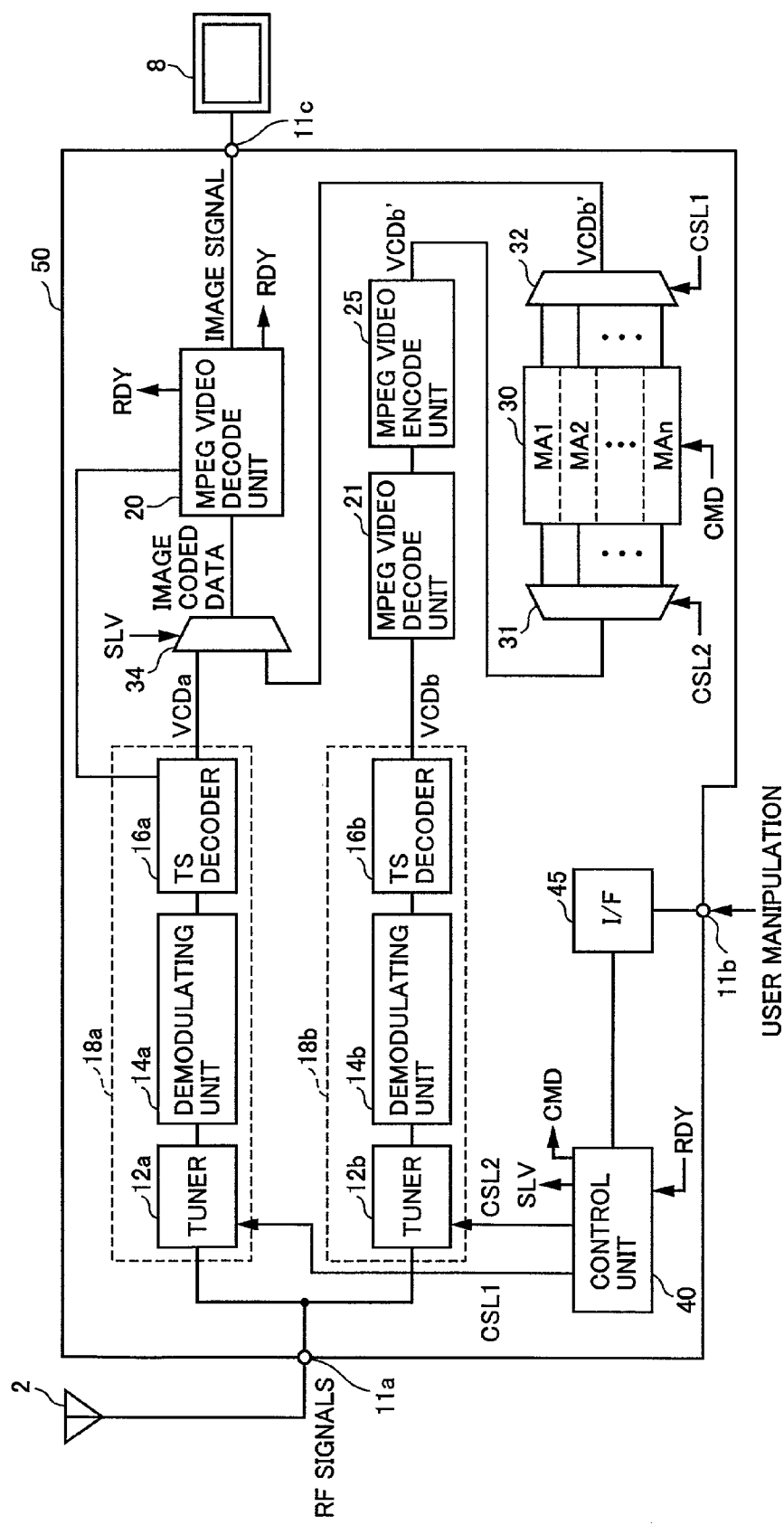
FIG. 4 is a block diagram related to the description of a main portion related to image signal processing of digital broadcast receiving apparatus according to a second embodiment of the present invention.

Referring to FIG. 4, a digital broadcast receiving apparatus 50 according to the second embodiment of the present invention differs from digital broadcast receiving apparatus 10 shown in FIG. 1 in that it further includes an MPEG video decode unit 21 and an MPEG video encode unit 25 provided corresponding to background data.

MPEG video decode unit 21 first decodes image coded data VCDb output by tuning unit 18b in order to generate background data. MPEG video encode unit 25 recodes image coded data VCDb decoded by MPEG video decode unit 21 and outputs image coded data VCDb'. Memory unit 30 stores the recoded image coded data VCDb' as the background data.

At this time, the recoding in MPEG video encode unit 25 is performed such that the amount of image coded data VCDb' after recoding is smaller than the amount of image coded data VCDb as output from tuning unit 18b. For instance, the resolution upon recoding may be set lower than the resolution corresponding to normal reproduction data so as to limit the capacity of the background data stored in memory unit 30.

Consequently, the memory capacity of memory unit 30 can be made more compact than in the case of digital broadcast receiving apparatus 10 shown in FIG. 1. As a result, reduction in cost and in size of the digital broadcast receiving apparatus can be achieved.

The arrangement in other portions of digital broadcast receiving apparatus 50 and the operations thereof are the same as those of digital broadcast receiving apparatus 10 shown in FIG. 1 so that the description thereof will not be repeated.

Modification to Second Embodiment

Figure 5:
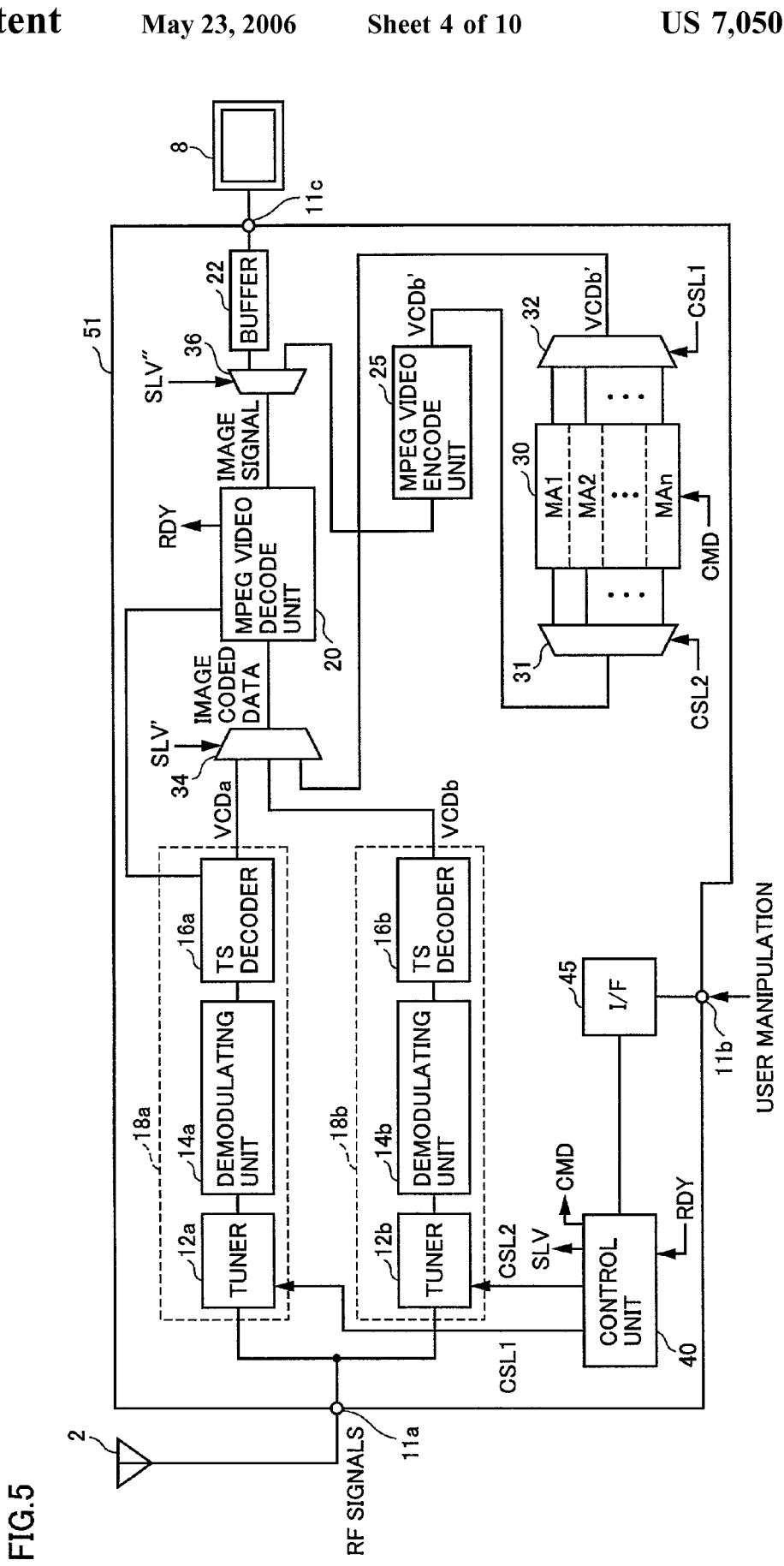
FIG. 5 is a block diagram related to the description of a main portion related to image signal processing of digital broadcast receiving apparatus according to a modification of the second embodiment of the present invention.

Referring to FIG. 5, a digital broadcast receiving apparatus 51 according to a modification of the second embodiment of the present invention differs from digital broadcast receiving apparatus 50 shown in FIG. 4 in that digital broadcast receiving apparatus 51 is not provided with MPEG video decode unit 21 and that digital broadcast receiving apparatus 51 further includes a data selector 36 and a data buffer 22 as subsequent stages to MPEG video decode unit 20.

The arrangement in other portions of digital broadcast receiving apparatus 51 and the operations thereof are the same as those of digital broadcast receiving apparatus 50 shown in FIG. 4 so that the description thereof will not be repeated.

In digital broadcast receiving apparatus 51, the process of decoding the image coded data corresponding to background data as described with FIG. 4 is performed using MPEG video decode unit 20.

Thus, in addition to image coded data VCDa from tuning unit 18a and image coded data VCDb corresponding to the background data from data selector 32, the recoded image coded data VCDb' from tuning unit 18b is also input to data selector 34.

Data selector 34 outputs one of image coded data VCDa, VCDb, and VCDb' to MPEG video decode unit 20 according to a reproduction data selecting signal SLV''.

By successively decoding image coded data from data selector 34, MPEG video decode unit 20 performs the decoding processing of data for normal reproduction and data for background reproduction to be displayed on image display unit 8 along with the decoding processing for limiting the amount of the background data to be stored in memory unit 30.

Thus, according to a reproduction data selecting signal SLV'', when MPEG video decode unit 20 decodes image coded data VCDa for normal reproduction and image coded data VCDb' for background reproduction to be displayed on image display unit 8, data selector 36 outputs the decoded image signal to data buffer 22. On the other hand, when MPEG video decode unit 20 decodes image coded data VCDb for generating background data to be stored in memory unit 30, data selector 36 outputs the decoded image signal to MPEG video encode unit 25.

As in the case shown in FIG. 4, MPEG video encode unit 25 performs recoding such that the amount of data is reduced from image coded data VCDb prior to decoding. As a result, like the case shown in FIG. 4, the memory capacity of memory unit 30 can be made small.

Thus, when the throughput of MPEG video decode unit 20 is sufficiently high, an arrangement may be adopted which allows temporary storage of the image signal to be sent to image display unit 8 in data buffer 22 so that the capacity of memory unit 30 can be made smaller without additionally providing an MPEG video decode unit.

Third Embodiment

The first and second embodiments describe the arrangements in which the reproduction of background data of the respective channels that are periodically updated is performed when normal reproduction is impossible. In other words, the digital broadcast receiving apparatuses according to the first and second embodiments inevitably require a plurality of tuner systems (tuning units). The third embodiment describes an arrangement that allows picture display during the normal reproduction wait period in relation to the case where a single tuner system (tuning unit) is provided.

Figure 6:
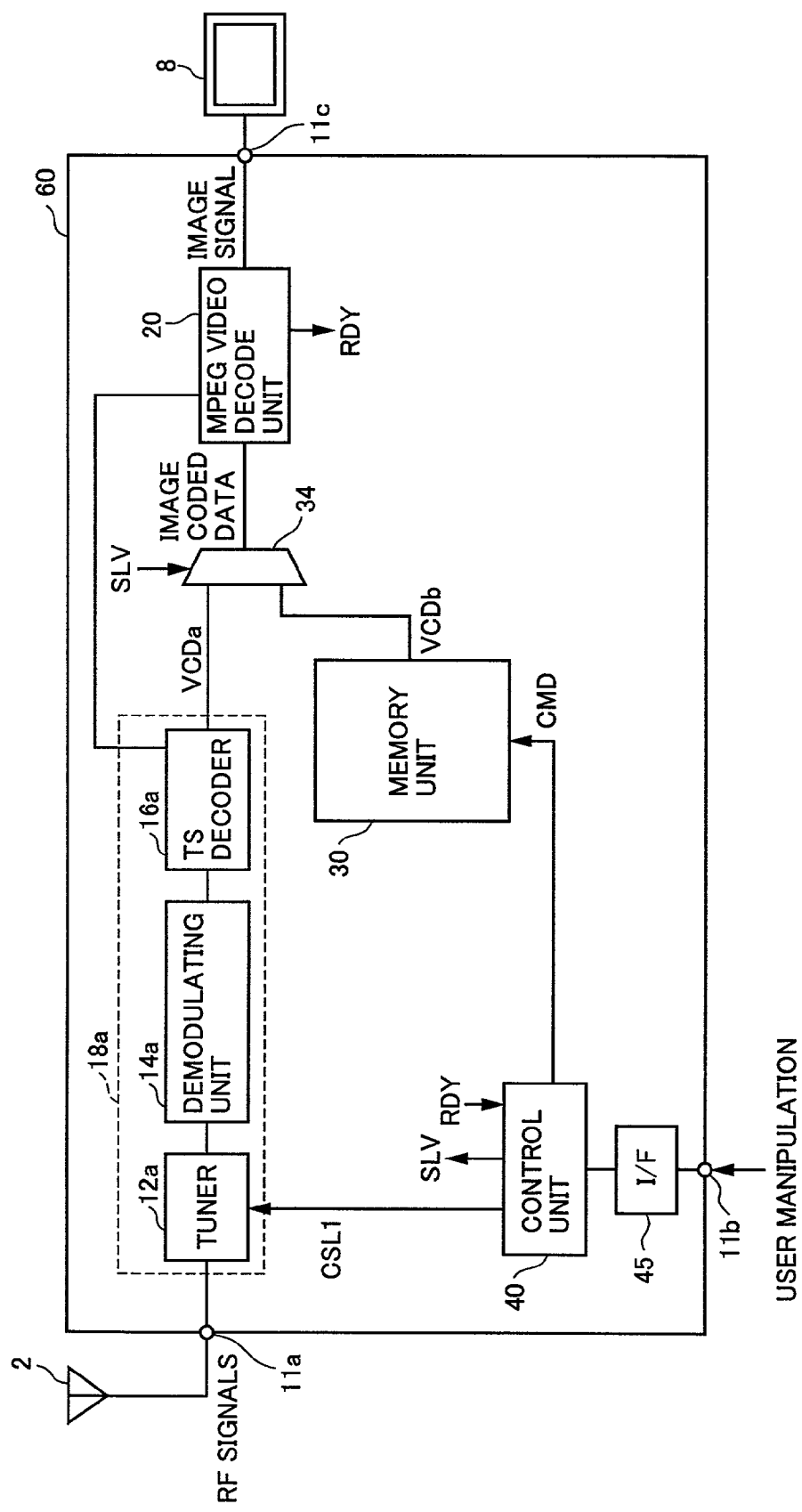
FIG. 6 is a block diagram related to the description of a main portion related to image signal processing of digital broadcast receiving apparatus according to a third embodiment of the present invention.

Referring to FIG. 6, a digital broadcast receiving apparatus 60 according to the third embodiment of the present invention includes an input terminal 11a for receiving RF signals which are the airwaves received by an antenna 2, an input terminal 11b for receiving user manipulation, an output terminal 11c for outputting to an image display unit 8 an image signal corresponding to a desired channel selected by the user, a tuning unit 18a for performing normal reproduction, a data selector 34, and an MPEG video decode unit 20. Tuning unit 18a includes a demodulating unit 14a and a TS decoder 16a.

Digital broadcast receiving apparatus 60 further includes a control unit 40, an interface unit 45 for transmitting to control unit 40 the user manipulation input to input terminal 11b, and a memory unit 30. A channel selecting signal CSL1 is set according to a desired channel selected by the user.

During the normal reproduction wait period, digital broadcast receiving apparatus 60 outputs an image signal for displaying a prescribed static image or motion image on image display unit 8. The prescribed picture displayed during the normal reproduction wait period will hereinafter also be referred to as a reception wait picture. Memory unit 30 stores image coded data for the reception wait picture stored before shipment.

When power-on or a channel switching instruction via interface unit 45 is detected, control unit 40 instructs memory unit 30 to output image coded data VCDb for the reception wait picture as well as switches to the data output path that is different from the data output path used for normal reproduction in data selector 34 until a flag signal RDY from MPEG video decode unit 20 is set to the signal level indicating that normal reproduction has become possible. Accordingly, data selector 34 outputs image coded data VCDb from memory unit 30 to MPEG video decode unit 20.

Thereafter, when the normal reproduction by MPEG video decode unit 20 becomes possible, control unit 40 switches data output selection of data selector 34 in response to the change of flag signal RDY and sends image coded data VCDa from TS decoder 16a to MPEG video decode unit 20.

With such an arrangement, it becomes possible to display a reception wait picture so as not to cause interruption in the image display even during the period in which normal reproduction is impossible upon power-on, immediately after channel switching, and so on. As a result, the discomfort caused to the user can be alleviated during the normal reproduction wait period.

First Modification to Third Embodiment

Figure 7:
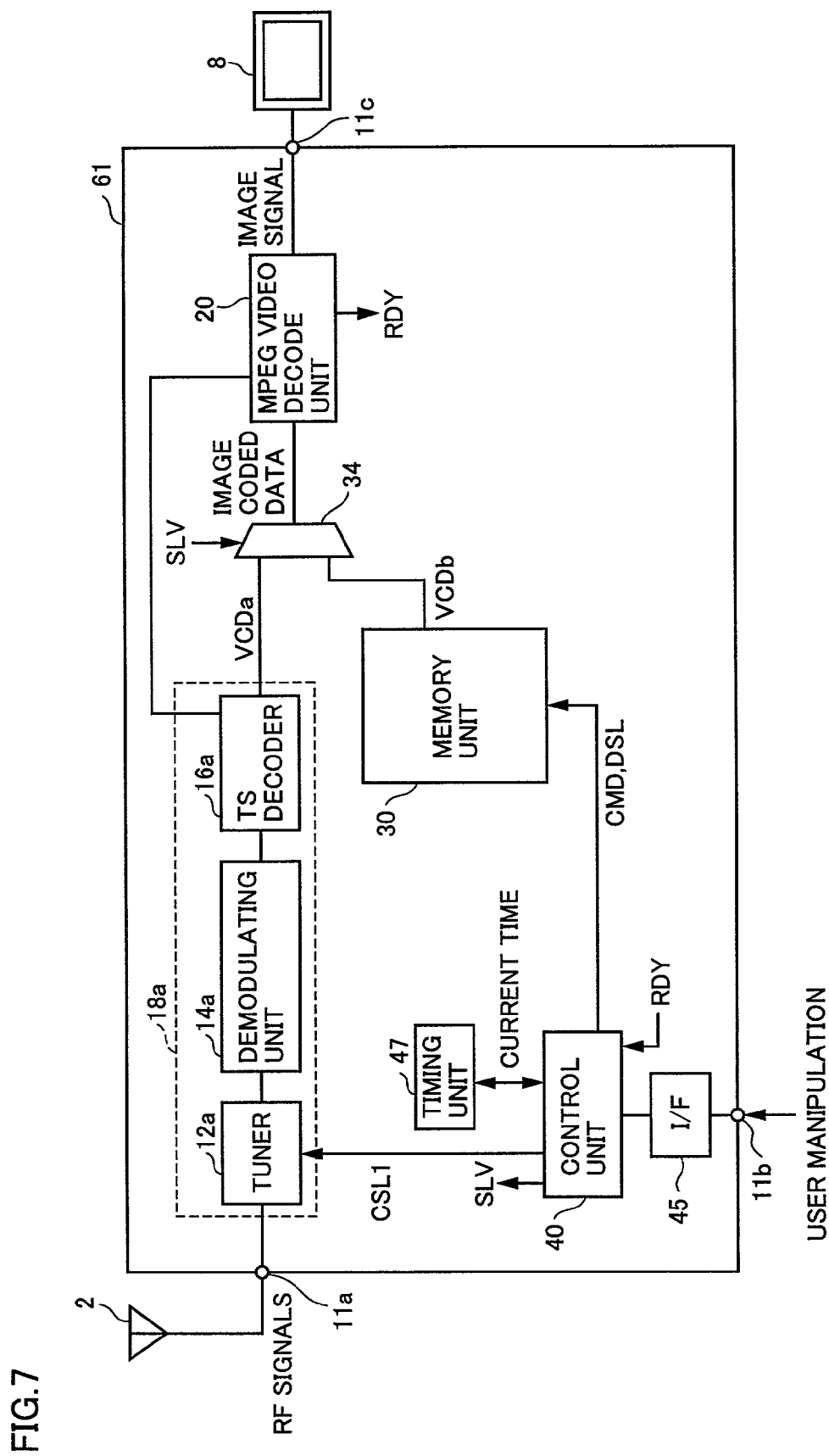
FIGS. 7 to 10 are block diagrams related to the description of a main portion related to image signal processing of digital broadcast receiving apparatus according to first to fourth modifications of the third embodiment of the present invention.

Referring to FIG. 7, a digital broadcast receiving apparatus 61 according to the first modification of the third embodiment of the present invention differs from digital broadcast receiving apparatus 60 shown in FIG. 6 in that digital broadcast receiving apparatus 61 further includes a timing unit 47. Timing unit 47 has the function of measuring at least one of the date and the time. Moreover, a memory unit 30 stores a plurality of image coded data respectively corresponding to a plurality of reception wait pictures.

A control unit 40 selects one of the plurality of image coded data stored in memory unit 30 according to the time of day, the day of week, and the season based on the current time or date measured by timing unit 47. In response to a memory control signal CMD and a picture selecting signal DSL, memory unit 30 outputs to a data selector 34 image coded data VCDb for displaying the reception wait picture selected by control unit 40.

With such an arrangement, it becomes possible to switch the display of the reception wait picture automatically according to the current date or time in digital broadcast receiving apparatus 61 so as to enhance its entertainment quality.

Second Modification to Third Embodiment

Figure 8:
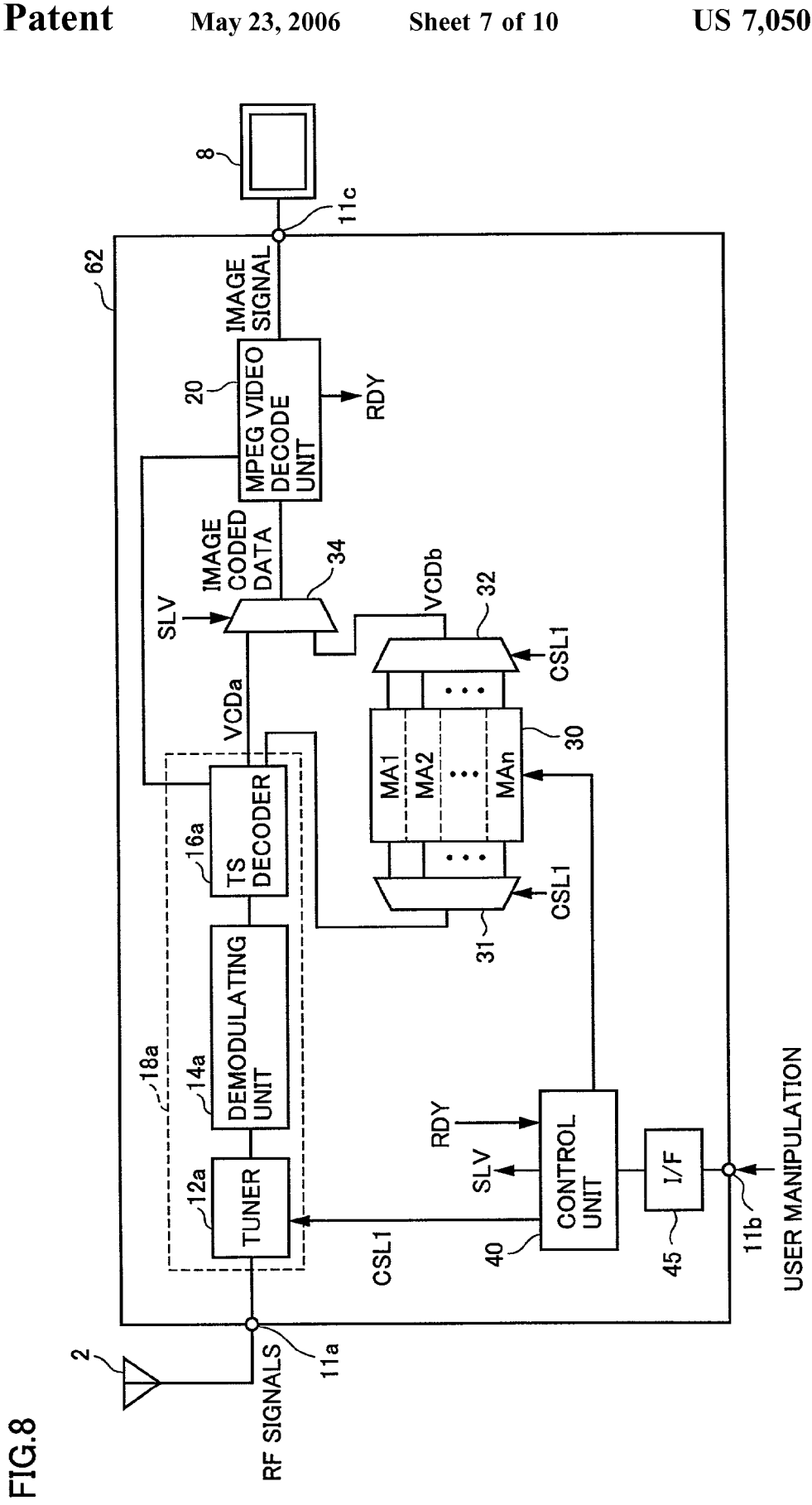

Referring to FIG. 8, a digital broadcast receiving apparatus 62 according to the second modification of the third embodiment of the present invention differs from digital broadcast receiving apparatus 60 shown in FIG. 6 in that digital broadcast receiving apparatus 62 further includes data selectors 31 and 32 corresponding to a memory unit 30.

Digital broadcast receiving apparatus 62 stores in memory unit 30 text information that a broadcast station had transmitted using data broadcast and the like and outputs the image signal to be displayed on image display unit 8 as a reception wait picture during the normal reproduction wait period.

Thus, memory unit 30 includes memory regions MA1 to MAn corresponding to the respective channels. A TS decoder 16a separates coded data corresponding to the text information from image coded data and the like and outputs the separated coded data to a data selector 31. Data selector 31 operates in response to a channel selecting signal CSL1, and stores the coded data from a tuning unit 18b into a memory region corresponding to the received channel.

During the normal reproduction wait period upon power-on or upon channel switching, the coded data corresponding to the channel currently selected by the user is sent from memory unit 30 to a data selector 34 via a data selector 32 that operates according to channel selecting signal CSL1. Thus, it becomes possible to display a reception wait picture according to information received from text data broadcast and the like.

Third Modification to Third Embodiment

Figure 9:
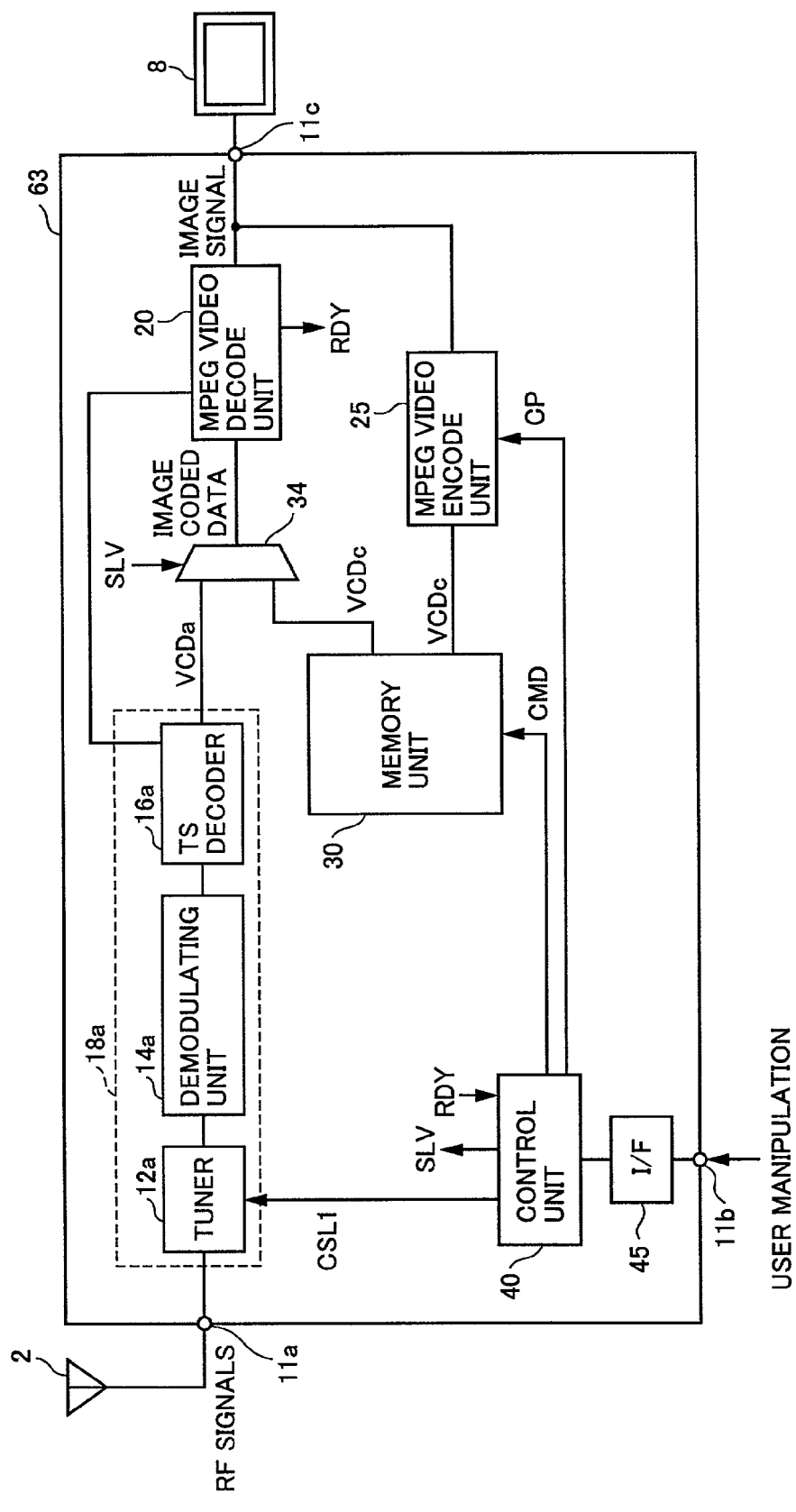

Referring to FIG. 9, a digital broadcast receiving apparatus 63 according to the third modification of the third embodiment of the present invention differs from digital broadcast receiving apparatus 60 shown in FIG. 6 in that digital broadcast receiving apparatus 63 further includes an MPEG video encode unit 25. MPEG video encode unit 25 codes an image signal output by an MPEG video decode unit 20 in response to a control signal CP generated by a control unit 40. Image coded data VCDc from MPEG video decode unit 20 is transmitted to a memory unit 30. Memory unit 30 stores image coded data VCDc as data for a reproduction wait picture.

Control signal CP is generated in response to a user instruction input to an input terminal 11b. Thus, it becomes possible for the user to capture any given static image or moving image from the display image being broadcast and to adopt it as the reproduction wait picture. Moreover, memory unit 30 can be made more compact by lowering the resolution in the coding by MPEG video encode unit 25 from the resolution of the normal reproduction.

Fourth Modification to Third Embodiment

Figure 10:
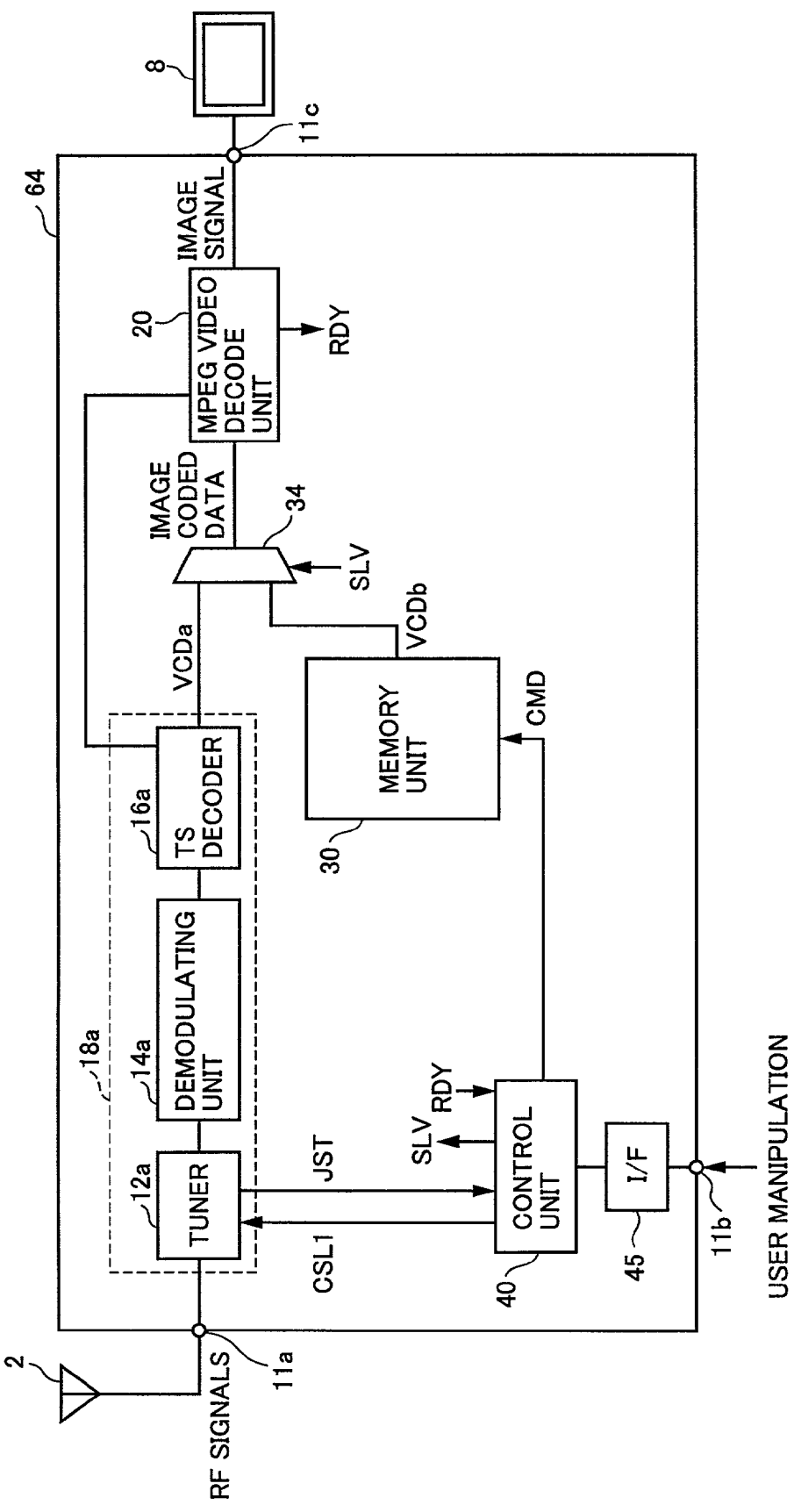
Figure 11:
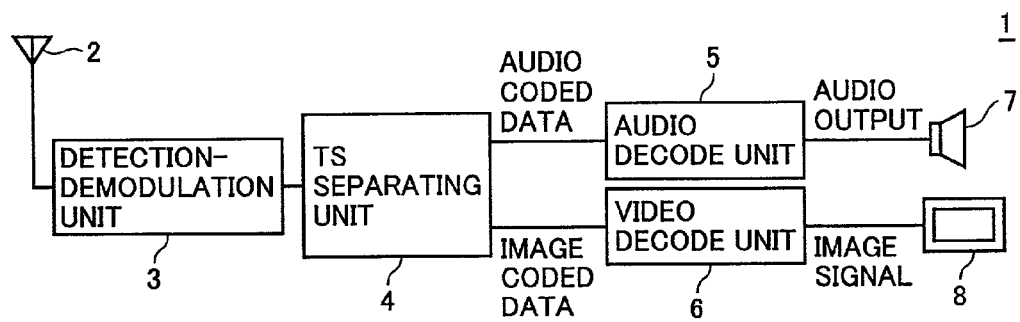
FIG. 11 is a schematic block diagram representing an arrangement of a general digital television broadcast receiving system.
Figure 12:
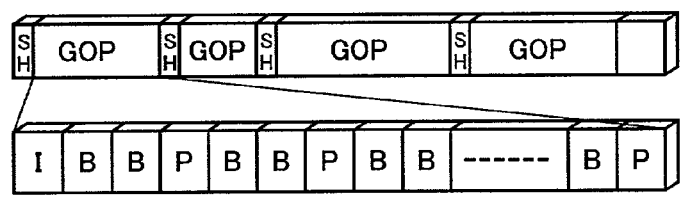
FIG. 12 is a schematic diagram related to the description of a composition of image coded data according to MPEG2.

Referring to FIG. 10, a digital broadcast receiving apparatus 64 according to the fourth modification of the third embodiment of the present invention differs from digital broadcast receiving apparatus 60 shown in FIG. 6 in that a receiving condition signal JST from a tuner 12a is input to control unit 40. Tuner 12a activates receiving condition signal JST when the input of the RF signals that are the airwaves received by an antenna 2 is interrupted, for instance, at a termination of broadcast or when the video signal is interrupted.

In addition to the normal reproduction wait period, at the time when receiving condition signal JST is activated, control unit 40 reads image coded data for displaying a reception wait picture to memory unit 30 in order to display the wait picture. Further, control unit 40 switches the setting of reproduction data selecting signal SLV such that the image coded data read from memory unit 30 is output by data selector 34.

Consequently, in addition to the normal reproduction wait period corresponding to the power-on or the channel switching, even at the termination of the broadcast or when input of the video signal is interrupted, it becomes possible automatically to invoke and display a reproduction wait picture on an image display unit.

Moreover, digital broadcast receiving apparatus 64 shown in FIG. 10, in addition to an arrangement of digital broadcast receiving apparatus 60 according to the third embodiment, displays a reception wait picture according to the receiving condition of the RF signals in a tuner. A similar arrangement, however, can be applied to digital broadcast receiving apparatus 10 according to the first embodiment, to digital broadcast receiving apparatuses 50 and 51 according to the second embodiment and its modification, respectively, and to digital broadcast receiving apparatuses 61, 62, and 63 according to the first to third modifications of the third embodiment, respectively.

Furthermore, the embodiments of the present invention has been described with regard to an arrangement for receiving digital broadcast using coded data according to the MPEG2 standard, the present invention is similarly applicable to reception of digital broadcast according to other coding standard such as the MPEG1 standard, the MPEG4 standard, and a motion JPEG (Joint Photographic Experts Group) standard.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital broadcast receiving apparatus for selectively receiving a desired channel based on a user instruction from a plurality of channels included in airwaves, comprising:

a first tuning unit for extracting from said airwaves first image coded data that corresponds to said desired channel;

a second tuning unit for successively selecting one of said plurality of channels as a background channel and extracting from said airwaves second image coded data that corresponds to said background channel;

a data storage unit for storing said second image coded data that correspond to the respective ones of said plurality of channels;

a first image data decoding unit for receiving and decoding one of said first image coded data and said second image coded data to generate an image signal for image display; and a control unit for determining whether it is possible or impossible to generate said image signal in accordance with said first image coded data based on a determination as to whether an amount of said first image coded data extracted by said first tuning unit has reached a certain amount that allows a normal reproduction; wherein said first image data decoding unit receives and decodes said second image coded data from said data storage unit to generate said image signal for image display when said image display based on said first image coded data is impossible in accordance with the determination of said control unit.

2. The digital broadcast receiving apparatus according to claim 1, further comprising:

a first data selecting unit for receiving said first image coded data from said first tuning unit and said second image coded data from said data storage unit corresponding to said desired channel and selectively outputting one of said first image coded data and said second image coded data according to the determination of said control unit, wherein said first image data decoding unit decodes an output from said first data selecting unit to generate an image signal.

3. The digital broadcast receiving apparatus according to claim 1, wherein when switching of said desired channel by a user is detected, said control unit sets an output from said first data selecting unit to said second image coded data until generation of said image signal based on said first image coded data in said first image data decoding unit becomes possible, and from a time when the generation of said image signal becomes possible, switches the output from said first data selecting unit, from said first image coded data to said second image coded data.

4. The digital broadcast receiving apparatus according to claim 1, further comprising:
   a second image data decoding unit for decoding said second image coded data extracted by said second tuning unit; and
   an image data coding unit for recoding said second image coded data decoded by said second image data decoding unit, wherein
   said data storage unit stores said second image coded data recoded by said image data coding unit, and
   the recoded second image coded data has a smaller amount of data than said second image coded data extracted by said second tuning unit.

5. The digital broadcast receiving apparatus according to claim 4, wherein
   said image data coding unit executes said recoding based on a second resolution that is lower than a first resolution that corresponds to said first image coded data.

6. The digital broadcast receiving apparatus according to claim 1, further comprising:
   a data buffer unit for temporarily accumulating said image signal output from said first image data decoding unit;
   an image data coding unit for recoding said image signal;
   a first data selecting unit for selectively outputting said image signal output by said first image data decoding unit to one of said data buffer unit and said image data coding unit according to the determination of said control unit; and
   a second data selecting unit for receiving said first image coded data from said first tuning unit and said second image coded data from said data storage unit corresponding to said desired channel, and said second image coded data from said second tuning unit corresponding to said background channel, and for outputting to said first image data decoding unit one of said first image coded data, said second image coded data from said data storage unit, and said second image coded data from said second tuning unit according to the determination of said control unit, wherein
   said data storage unit stores said image signal recoded by said image data coding unit as said second image coded data, and
   said recoded second image coded data has a smaller amount of data than said second image coded data extracted by said second tuning unit.

7. The digital broadcast receiving apparatus according to claim 6, wherein
   said image data coding unit executes said recoding based on a second resolution that is lower than a first resolution that corresponds to said first image coded data.

8. The digital broadcast receiving apparatus according to claim 1, wherein
   said control unit successively updates selection of said background channel in a constant cycle.

9. The digital broadcast receiving apparatus according to claim 1, wherein
   said first image data decoding unit monitors the generation status of said first image coded data by said first tuning unit; and
   said control unit receives information indicating whether said amount of said first image coded data extracted by said first tuning unit has reached said certain amount, from said first image decoding unit.

* * * * *